US005524746A

United States Patent [19]

Massen et al.

[11] Patent Number: 5,524,746

[45] Date of Patent: Jun. 11, 1996

[54] INDIVIDUALIZING SERVICE FOR SORTING PARTICLES OF A BULK MATERIAL

[75] Inventors: Robert Massen, Radolfszell, Germany; Hugo Hegelbach, Busswil, Switzerland; Jürg Zuber, St. Gallen, Switzerland; Hans Tobler, Algetshausen, Switzerland; Niklaus Schoenenberger, Herisau, Switzerland; Helmut Zapf, Bockenem; Helmut Gemsjäger, Braunschweig, both of Germany

[73] Assignee: Bühler AG, Uzwil, Switzerland

[21] Appl. No.: 276,001

[22] Filed: Jul. 15, 1994

Related U.S. Application Data

[62] Division of Ser. No. 963,820, Oct. 20, 1992, Pat. No. 5,379,949, which is a continuation of Ser. No. 733,112, Jul. 19, 1991, abandoned.

[30] Foreign Application Priority Data

Sep. 14, 1990 [DE] Germany .......................... 40 29 202.9

[51] Int. Cl.$^6$ .............................. B65G 47/12; B65G 47/22

[52] U.S. Cl. .......................... 198/443; 198/493; 198/803.5

[58] Field of Search .................................. 198/443, 461.1, 198/493, 803.5; 209/643, 644, 920

[56] References Cited

U.S. PATENT DOCUMENTS

| | | | |
|---|---|---|---|
| 3,990,580 | 11/1976 | Self | 209/920 X |
| 4,505,371 | 3/1985 | Krueger et al. | 198/493 X |
| 4,741,428 | 5/1988 | Taniguchi et al. | 198/493 X |
| 4,881,689 | 11/1989 | Lippuner et al. | 241/9 |
| 4,901,841 | 2/1990 | Haggerty et al. | 209/920 X |
| 4,905,917 | 3/1990 | Fetzer et al. | 241/30 |
| 5,031,845 | 7/1991 | Gemsjäger | 241/78 |
| 5,348,136 | 9/1994 | Kenny et al. | 198/443 |

FOREIGN PATENT DOCUMENTS

| | | | |
|---|---|---|---|
| WO8908501 | 9/1989 | European Pat. Off. . | |
| 3701335 | 7/1988 | Germany . | |
| 4030344 | 4/1992 | Germany . | |
| 5132122 | 5/1993 | Japan | 198/493 |
| 1719282 | 3/1992 | U.S.S.R. | 198/493 |
| 1393061 | 5/1975 | United Kingdom . | |
| 1546548 | 5/1979 | United Kingdom . | |
| 2013875 | 8/1979 | United Kingdom . | |
| 1604745 | 12/1981 | United Kingdom . | |
| 2091415 | 7/1982 | United Kingdom . | |
| 9411281 | 5/1994 | WIPO . | |

OTHER PUBLICATIONS

Sortex 962S, prior to 1975.
Kroma–Sort Manual, pp. 2–11 , 2–12.

*Primary Examiner*—William E. Terrell
*Assistant Examiner*—Tuan Nguyen
*Attorney, Agent, or Firm*—Martin A. Farber

[57] ABSTRACT

An apparatus for sorting particles of a bulk material moving on a transport ribbon (38) comprises an electro optical monitoring unit (101) above transport ribbon (38) for detecting the particles to be sorted out. Jet nozzles (45, 46) are controlled by a signal emitted by this electro optical monitoring unit (40), the jet nozzles being provided at the side opposite the bulk material of transport ribbon (38), which consists of an air permeable material. By means of the gas jet passing through transport ribbon (38), the particles to be sorted out are lifted off from the transport ribbon and are thrown into storage containers (47, 48).

The bulk material is passed through a gap between rollers or grinding elements to provide flake-shaped particles which are then observed to provide first and second measurements which are subtracted from each other. A vibrating conveyor 87 with feeding channels 87.1 separate particles for disposition upon a ribbon 538 with the aid of a jet nozzle n.

15 Claims, 10 Drawing Sheets

INDIVIDUALIZING SERVICE FOR SORTING PARTICLES OF A BULK MATERIAL

RELATED APPLICATION

This application is a division of Ser. No. 07/963,820, Oct. 20, 1992, now U.S. Pat. No. 5,379,949, which is a continuation of Ser. No. 07/733,112, Jul. 19, 1991, abandoned.

FIELD OF THE INVENTION

The invention relates to a method for sorting particles of a bulk material, or of similar mass-produced goods, which is passed by a sensor on a supporting surface, and is then sorted out according to the signals of the sensor.

BACKGROUND OF THE INVENTION

Such a method, or apparatus therefor, respectively, has become known from the GB-PS 1 393 061. In this known arrangement, the bulk material is on a transport ribbon, above which a video camera is provided, and at the end of which an array of nozzles that can be actuated individually are arranged across the width of the transport ribbon. Differences in luminosity of the particles on the transport ribbon are detected with the help of the video camera, and, via a comparator circuit, one of the nozzles is actuated with a corresponding time delay to eject the respective particle out of the path of the bulk material, thereby sorting it out. A disadvantage of this arrangement is provided by the fact that it is often not possible to eject the very particle to be sorted out by means of the gas jet acting on the particles falling off the transport ribbon in a free fall. For this reason, it was unavoidable to operate the air nozzles during a longer period of time than it would have been necessary as such, which, in turn, resulted in the ejection of more particles than required, that is, among the particles of an unacceptable quality that had been sorted out there was to be found also a high percentage of such particles of an acceptable quality.

From the DE-A-37 01 335 a method for sorting particles of a bulk material has become known, initiated by a presorting step, by means of which a part of the bulk material containing particles to be sorted out, is segregated. Also in such a case, that part of the bulk material that has been segregated (similarly to the GB-PSen 1,546,548 or 2,091, 415) is passed, while falling freely, by an electro optical monitoring unit that detects the particles to be sorted out and controls an air nozzle, by means of which the particles falling down freely are deflected from their path. It is true that mechanically actuable flaps were used for this presorting step, but these were not capable of conducting a precise sort, for which reason a second sort was required.

It is an object of the invention to provide an apparatus for sorting particles of a bulk material, which apparatus ensures an exact ejection of the particles to be sorted out, even in such cases where the individual particles of the bulk material are of different sizes; in particular, by means of the apparatus provided by the invention, the chronological relationship between the detection of an imperfect particle and the operation of the pneumatic ejection unit is to be better coped with, thus enabling an improved sorting accuracy.

SUMMARY OF THE INVENTION

For attaining this object, extensive tests have been conducted by the applicant to ascertain the factors that led to the unsatisfactory quality of the sorted material, which unsatisfactory quality, in conjunction with the corresponding great loss of qualitatively good material, however, has always had to be put up with up to now. In a first step leading toward the solution it became evident that, due to the irregularity of the arrangement of the particles on the transport ribbon, no precise predictions could be made as to the point of time when it would pass by the respective air nozzle. Also the previously used method of the free fall turned out to be detrimental to the intended aim, firstly because particles of different sizes and shapes have differing rates of fall, secondly because irregularly shaped particles tend to be subjected to a tumbler movement when falling freely, which, in certain cases, may even impair the monitoring.

These findings entailed the second step that led to the present invention, consisting in first arranging said particles in a predetermined position and orientation relatively to each other before advancing them, moving the particles in this position with a predetermined speed.

To carry out the method as advantageously as possible, it is preferred to use a supporting device being made—at least in partial areas that receive the particles in a predetermined position and orientation relatively to each other—from an air permeable material.

The supporting device may be rigidly mounted, for example in a slightly sloping way, with the bulk material advancing on it by the action of vibrations generated by suitable devices. Preferably, said supporting device is composed of a transport ribbon transporting the bulk material on. Transport ribbons—being made, however, not from a material permeable to air—for the further transportation of the bulk material, are already known, as previously mentioned, from the GB-PS 1 393 091.

The transport ribbon may be made from a screen tissue, being substantially of a quality as that used with paper machines. Preferably, the transport ribbon is made from a textile fabric, particularly from a polymeric material, if necessary, from polymer bristles. Such a fabric comprises, on the one hand, the required air permeability to a sufficient extent, on the other hand, it prevents the individual particles from becoming jammed on the ribbon, thereby ensuring that the particles to be sorted out will be lifted off accurately from the transport ribbon. A particularly advantageous construction is composed of a transport ribbon comprising a coated supporting surface made from a fabric web, said coating being missing at least in partial areas for receiving said particles in a predetermined position and orientation relatively to each other.

With very high speeds, however, the transport ribbon is liable to be subjected to vibrations under certain circumstances. In such a case, it is advisable to provide the supporting device with a drum unit having air permeable openings, with the additional utilization of a transport ribbon not being excluded, for example by arranging the drum within the area of the monitoring unit, whereas the further transportation is accomplished by the ribbon, which may be covered for a certain distance, if necessary.

For an exact determination of speed and position it is advantageous to connect the supporting device with a unit for providing clock signals with a frequency corresponding to the speed of said supporting device, said clock signal unit comprising markings arranged in spaced relationship to each other, in particular in predetermined distances from each other; particularly to be read by the same monitoring unit, which also monitors the particles.

Particularly for the electro optical monitoring unit it is of advantage to color the supporting device in a color contrasting to that of the bulk material, or of similar mass-produced goods, preferably a full color, in particular the color blue; on the one hand, because a basic requirement for a distinct contrast will thus be given, on the other hand, because this design allows to filter out the background in the manner of the known "blue-box effects", but lastly also because blue is that color that differs most from the one of natural products.

Since the particles have to be as orderly arranged as possible, their individualization will be of increased importance. This is preferably done by means of an individualizing unit comprising a supporting device having a rugged surface to form indentations for receiving each a particle to be sorted; to which supporting device is assigned an accelerating unit for imparting an accelerated motion to the particles.

The accelerating unit may comprise a nozzle unit for directing a gas jet against the supporting device.

The supporting device may comprise, at least in the area of the individualizing unit, suction openings, and a source of reduced pressure for sucking and holding the particles within the area of the suction openings.

The supporting device further comprise a covering unit at the suction side of the suction openings, in particular with a sealing, such as a lip seal, in the area of the sort, which covering unit is capable of elimininating the suction in this area.

The accelerating unit can have a brush drum unit rotating for throwing the particles in direction to the supporting device.

The supporting device also comprise a guiding surface for guiding the particles from the brush drum unit to the supporting device.

In principle, a supporting device, as provided by the invention, would allow to bias it from above with a sorting apparatus, for example by providing air nozzles at its upper side and by deflecting the air jet at its lower side by reflector arrangements in such a manner that the undesired particle will be ejected. For carrying out the method in accordance with the invention, however, it is preferred, to use a sorting apparatus with at least one pneumatic ejector unit, which latter is arranged at the side opposite the particle carrying surface of the supporting device.

Since—according to the method provided by the invention—position and rate of speed of the particles, even for longer distances, are known precisely, the sorting apparatus may comprise at least two pneumatic ejection units in the direction of movement of the bulk material, or of similar mass-produced goods, located one after the other, with individual collecting units being assigned to each respective ejection unit for the particles thrown out, in order to achieve, either a greater speed for the sorting process by having the one particle ejected by the one ejector unit, and an immediately following particle ejected by the other unit. In addition, or alternately, at least two, particularly pneumatic, ejector units may be arranged one behind the other in the direction of movement of the bulk material, with each ejector unit being assigned a separate collecting unit for the ejected particles. Thus, it will be possible to accomplish a multiple sort of the bulk material, e.g., according to color or luminosity, or dependent on the size and the like, with particles of a, for example, slightly darker color being segregated by the one ejector unit, and particles of a very dark color by the other ejector unit.

To be able to increase the speed of the transport ribbon for augmenting the throughput, without, however, thereby disturbing the air jets sent out by the pneumatic ejector units, it is preferred to provide at least one pneumatic ejector unit within the area of a turning roller for the transport ribbon. This pneumatic ejector may be arranged as a stationary unit, thus simplifying the construction of the air supply and the control of the individual pneumatic ejector units. However, this entails a relative motion between the rigidly mounted ejector unit and the transport ribbon, which may be disadvantageous, particularly in the case of fast-moving transport ribbons. To prevent such a relative motion, the air nozzles that form at least one pneumatic ejector unit are suitably designed as rotatable elements in conjunction with the turning roller. Such an arrangement has the further advantage that the particles are subjected to a certain tangentially acting force component, which fact facilitates the ejection, thus making it possible to reduce the intensity of the air jet.

According to the prior art, the standardization of the background has always caused problems (cf. GB-PSen 1 604 745, 2 013 875 or 2 091 415). Nevertheless this problem takes care of itself if the monitoring unit has a light-electric transducer the output signal of which can be directed to an input of a vectorial difference determinining unit, while the other input of this vectorial difference determining unit obtains a standardized nominal value signal. When using this arrangement, it is not a question of determining a difference in luminosity, as this is commonly the case, but of determining a vectorial difference, i.e., a difference relating to the individual color vectors.

With the embodiment provided by the invention, however, not only the sorting of particles of different colors, or luminosities, respectively, but also the sorting of particles of different shapes, or sizes, respectively, can be made possible, for as a tumbler movement will be prevented and the position of the particles will be predetermined and known, a really accurate determination of such a kind will finally be guaranteed. For this purpose, according to a further characteristic of the invention, an image-analyzing processor for the determination of the shape and/or size of the particles is connected to the electro optical monitoring unit, which is preferably designed in the form of a video camera, with said image-analyzing processor emitting the signal for the control of the pneumatic ejector unit. Such an apparatus may be used to particular advantage for sorting rice, with broken rice, for example, being carried to one separate collecting unit, imperfectly shelled, brownishly discolored rice, to another collecting unit, for which purpose a shape processor known per se may be used conveniently.

For the operation of the monitoring unit in accordance with the invention, a method is particularly suited, in which at least one reference particle is presented to the monitoring unit; that then a statistic is made from the color signals of the occurring color vectors obtained; that hereafter a predetermined threshold value is given to eliminate statistically rare color vectors; and that, in a last step, the remaining color vectors are memorized in a memory so as to dispose of a number of statistically significant vectorially processed color signals, occurring at the reference particle. With this arrangement, the input of the colors is greatly facilitated. Here, the "IHS-method" for the processing of color signals will be of particular advantage, especially because the luminosity is of lesser importance, or may even be disregarded altogether. The same steps can also be effected relating to the background of the reference particle so as to dispose of the color vectors of the background.

At least at the beginning of operation, a comparison can be made with a standardized color sample, and in the case of variations in the color vector for the illumination, a corresponding shift of the contents of the memory will occur.

Furthermore, a shape processor for the detection of shape and/or size of the respective particle may only be actuated when the vectorial difference determining unit has found the color of the particle to be acceptable.

In most systems now commonly used, there are provided jet nozzles. Of course, such nozzles require a correspondingly quick control, and in this respect, the throughput capacities for the particles to be inspected will be naturally limited. It is true that it has already been suggested that two sorting systems for a coarse sort and a fine sort should be arranged in series, but in fact this means only shifting the problem because in such a case also the coarse sort will have to work faultlessly. From the GB-PSen 642 283 and 642 284 the proposal has become-known to utilize the electrostatic effects between two surfaces, one of which is electrostatically chargeable. Yet these suggestions have met with no response at all in practice, since the desired results could not be achieved by using the suggested methods.

Moreover, it will be of advantage to use an individualizing unit for arranging the particles in a predetermined position and orientation relatively to each other on the supporting device. In this connection, the term "individualizing device" must not be understood as designating a device that forces the particles exlusively one behind the other into their predetermined positions, rather also a plurality of rows may be arranged in series, if desired, offset from one another.

Surprisingly, it has become evident that the kind of optical monitoring unit used as yet solely for sorting purposes can also be employed for the adjustment of a grinding gap, in particular with roll mills comprising at least two rolls, in which the basic material, after passing through a treatment zone, in particular through the grinding gap, is inspected by at least one light-electric transducer, to which can be directed an electromagnetic radiation reflected from the bulk material, or similar mass-produced goods, and the supporting device thereof; which light-electric transducer then releases an electric output signal in dependendy upon the amount of radiation received, with the output signal being used mediately or immediately for the regulation of, particularly, the size of the grinding gap.

BRIEF DESCRIPTION OF THE DRAWINGS

Other details of the invention will result from the following description of embodiments schematically shown in the drawings, in which FIG. 1 shows an apparatus provided by the invention for sorting bulk material in a perspective view, and FIG. 2 a detail of a first embodiment of the apparatus in accordance with the invention in a perspective view, and FIG. 3 a detail of a second embodiment of the apparatus provided by the invention in side view, and FIG. 4 a plan view of a preferred arrangement and design in the area of the monitoring unit, and FIG. 5 a section along the line V—V of FIG. 4 across the preferred design of a ribbon, and FIG. 6 a modified design for monitoring two sides of the particles of the bulk material particles opposite each other, and FIG. 7 a preferred circuit of the monitoring unit, whose suitable mode of operation is explained with the help of FIG. 7A which shows a three dimensional graph of signal processing parameters, and of which FIG. 7B shows a detail in greater completeness, in which a tridimensional histogram processor is to be seen, and FIG. 8A, 8B an embodiment of a plant in accordance with the invention with an individualizing device provided by the invention, in which FIG. 8B illustrates the detail B of FIG. 8A on a larger scale, and FIG. 9A, 9B a further embodiment of an apparatus according to the invention with another individualizing device, in which FIG. 9B shows the detail B of FIG. 9A on a larger scale and in a longitudinal section paralleling the plane of the drawing of FIG. 9A, and FIG. 10 a further modification of a plant with a supporting device modified with respect to previous embodiments, and FIG. 11 a detail of a further individualizing device, in which

DETAILED DESCRIPTION OF THE DRAWINGS

Figure 1:
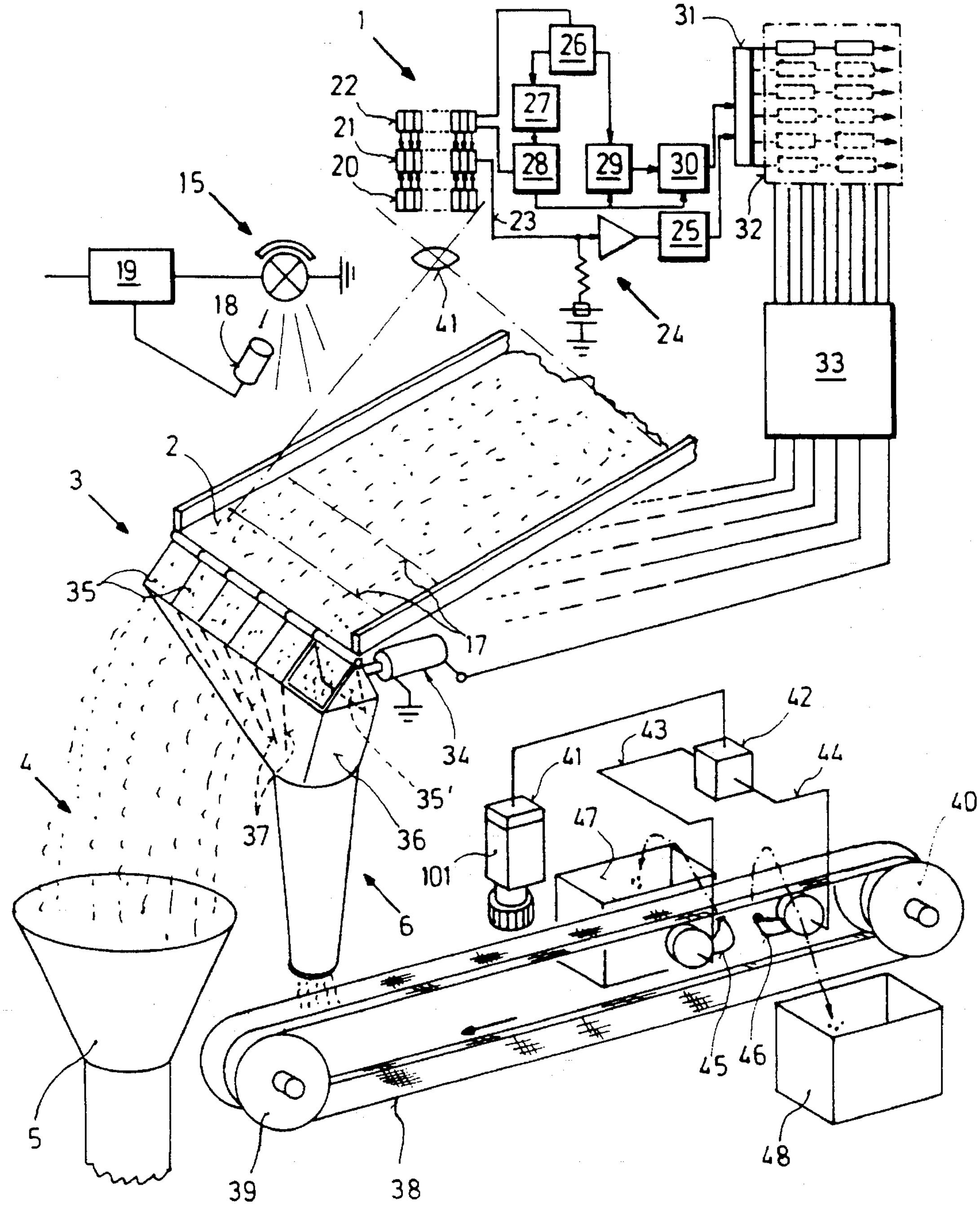

The apparatus represented in FIG. 1 comprises an individualizing device, by means of which a partial stream of the bulk material, containing particles to be sorted out, is segregated, and from which partial stream the particles to be sorted out will be removed thereafter with the help of the characteristics provided by the invention.

The presorting unit comprises a video camera 1 arranged above a stream of bulk material that is moved along a supporting surface 2. At the end of the supporting surface 2, there is a deflecting unit 3 whose function is to divide the stream into two paths. With this arrangement, the particles detected as "acceptable" pass, in quite large a stream 4, into a guidance 5, whereas a partial stream of the bulk material moving along the supporting surface branches off and then reaches a hopper 6.

The video camera comprises a target 20, preferably in the form of at least one diode array, to which is joined a corresponding array of switching elements 21 for the interrogation of the individual diodes, or image elements and a shift register-22 controlling them, respectively. It is evident that bucket-brigade devices or charge coupled devices may be used, if necessary. It would also be possible to utilize the target of a customary video camera. The video signal interrogated by switches 21 reaches, via a line 23, a repeater circuit 24, depicted merely in part, which is succeeded by a video processing stage 25. Simultaneously, shift register 22 represents a part of the deflecting circuit comprising a clock generator 26, a counter 27 and a start or reset pulse generator 28 for the control of shift register 22. To enable the circuit to detect which image element, or which diode of array 20, respectively, has just been addressed, a counter 29 receives both the clock pulses of generator 26 and the reset pulses of generator 28, with, possibly, an evaluation stage 30 being provided. The video signal from stage 25 and the localization signal from stages 29, or 30, respectively, are led to a comparator or coincidence stage 31, which, at the occurrence of an error signal (luminosity, or color of a particle, does not correspond to the nominal value range) detects, at which image element this error occurs, i.e., at which position of the viewing field 17—represented in dot-dash lines in FIG. 1—of the video camera 1 the defective particle was viewed. Via an evaluation circuit 32 another array of switching elements 33 is controlled, depicted solely as block, via which the actuator 34 (only one is shown) corresponding to the respective position of the defective particle can be controlled.

This actuator 34 is already a part of the deflecting unit 3. The deflecting unit 3 comprises a plurality of flaps 35, or 35', respectively, arranged above channels 37 that are located above a feed hopper 36. Either flap 35, or 35', respectively, can take up two positions. In the one position 35, the bulk material is carried over the feed hopper 6 and thus falls, in the form of a stream 4, into guidance 5, whereas, in the other position 35', the feed hopper 36 is opened, so that a partial stream of the bulk material, which corresponds to the width of the flap, or shaft 37, respectively, is directed, via the respective shaft 37, into hopper 6.

In the path of reflected rays of the lamp 15 there is arranged a light-electric transducer 18 whose output signal is compared with a desired value in a comparator and control circuit 19, and, if necessary, the luminosity of lamp 15 is readjusted so that it may correspond to the respective desired value.

Below hopper 6, an air permeable transport ribbon 38 made from screen tissue particulary from polymer bristles, is led around two turning rollers 39, 40, of which one roll is driven in a manner not shown. The turning rollers 39, 40 are preferably constituted of two truncated cones whose smaller basal planes are connected with each other. Thereby, the ribbon 38 is substantially given a V-shape, so that the particles falling down will remain at a specific place, that is, in the middle of transport ribbon 38.

Above transport ribbon 38 there is arranged a further video camera 101, which, in principle, may be similar to video camera 1. However, it is preferably associated with an image-analyzing processor 41, with the output of this processor being in connection with an actuator circuit 42. In the present case, the actuator circuit has two control outputs 43, 44, respectively leading to one of two air nozzles 45, 46, where they control the air supply (not shown).

It appears from FIG. 1 that the two air nozzles 45, 46 are aligned one behind the other, so that they will be operated selectively to blow a specific particle out of the path of transport ribbon 38. Accordingly, the two air nozzles 45, 46 are oriented in different directions, with each of these air nozzles 45, 46 being assigned a separate storage container 47, or 48, respectively, with air nozzle 45 throwing the particles—as represented in dot-dash lines—into storage container 47, or air nozzle 46 into storage container 48, respectively.

It is evident that according to the number of the different sorting types to be distinguished, a corresponding number of air nozzles 45, or 46, respectively, may be provided. Each air nozzle is then suitably inclined in another direction, so that deviations of the air jet or of the position of the particle may not result in incorrect sorting results. Nevertheless, practice has shown that the sorting system with ribbon 38 is capable of handling a sufficiently large throughput of bulk material, so that a presorting step, as represented in FIG. 1 will not be required, for which reason the embodiments described below, particularly that one according to FIG. 4, with several particles viewed in parallel rows, will be preferred.

Figure 2:
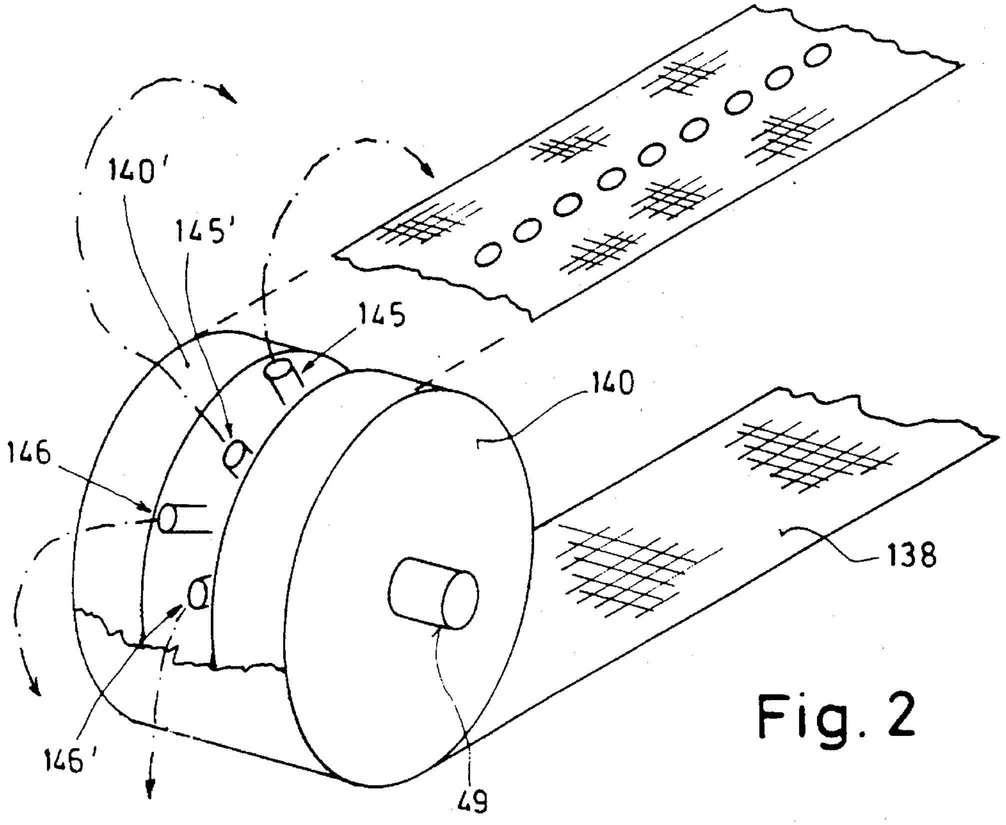

According to FIG. 2, air nozzles 145, 145' and 146, 146' are arranged in the area of a turning roller 140. The ribbon 38 is flat in this case. Turning roller 140 is divided and comprises a further roller part 140' on a common shaft 49. In between them, nozzles 145 to 146' are arranged stationary and oriented so that they blow in different directions, as shown in dot-dash lines.

Figure 3:
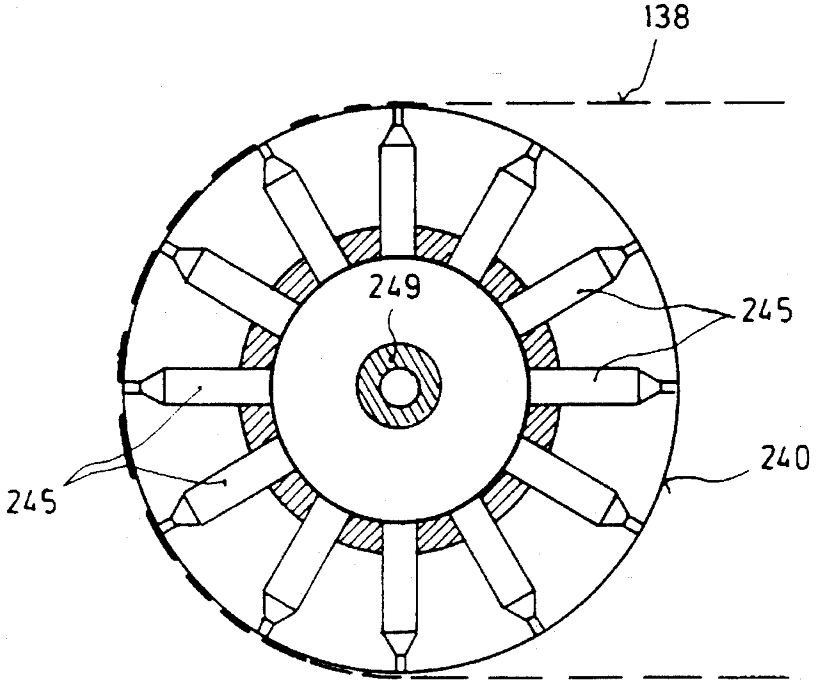

In the case of the embodiment according to FIG. 3 there is provided a drum-shaped turning roller 240 for the ribbon 238, to which drum-shaped turning roller 240 are assigned air nozzles 245 that rotate with drum-shaped turning roller 240 and the discharge openings of which are provided on the surface of the drum circumference. With such an embodiment, however, it is necessary to provide a valve circuit for each respective air nozzle, said valve circuit causing only those air nozzles to blow out air which are in positions as depicted in FIG. 2. Such a valve circuit is not shown; however, it will be evident to someone skilled in the art that for this purpose corresponding sliding contacts for the power supply of solenoid valves are to be provided.

It also appears from the lines of fall according to FIG. 2, shown in dot-dash lines, that the arrangement of air nozzles 145, 145', 146, 146' has the advantage that the particles can easily be sorted out in different directions at a given location.

Figure 4:
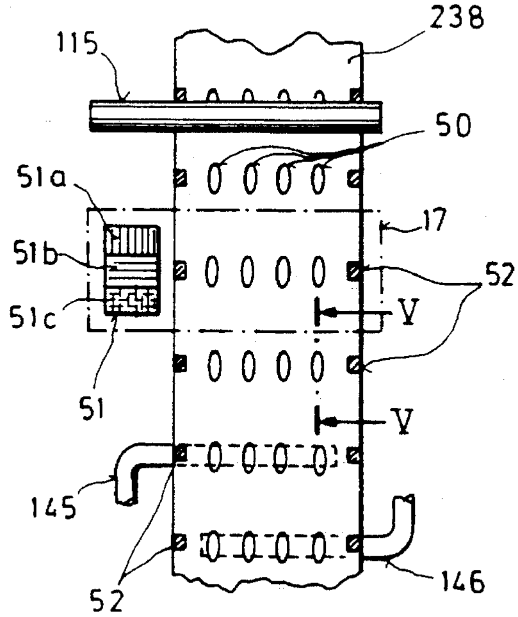

FIG. 4 depicts a ribbon 238 with several indentations 50, disposed in a side-by-side relationship, which are to receive one particle of bulk material each, such as a grain of rice. These indentations 50 cause even a plurality of particles arranged in a side-by-side relationship in a single row to assume an orderly, predetermined position. In this arrangement, ribbon 238 is assumed to transport the particles from top to bottom (with respect to FIG. 4), with the particles being directed through the visual field 17 of a video camera (not shown). Since the particles of bulk material, at least in the case of natural products, have mostly colors mixed with gray tones, it will be advantageous to color ribbon 238 in a full color, for example, in a contrasting color, such as blue.

Figure 6:
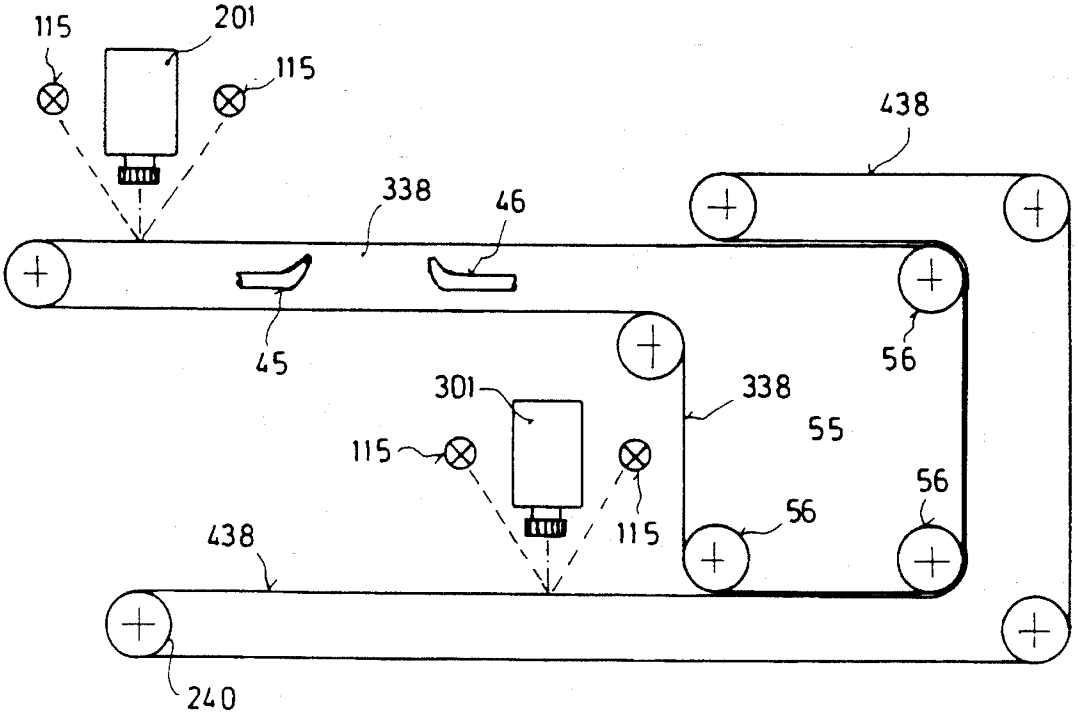

It is true that conveniently at least one illumination unit 115, for instance in the form of a fluorescent lamp, should be provided, and particularly even two of them, as shown according to FIG. 6, but the daylight may have a disturbing influence, as well as voltage fluctuations or changes of current intensity in the power supply. To eliminate these influencing variables, numerous suggestions have been made as to the regulation of the background luminosity. Yet here another method will be proposed.

Figure 7:
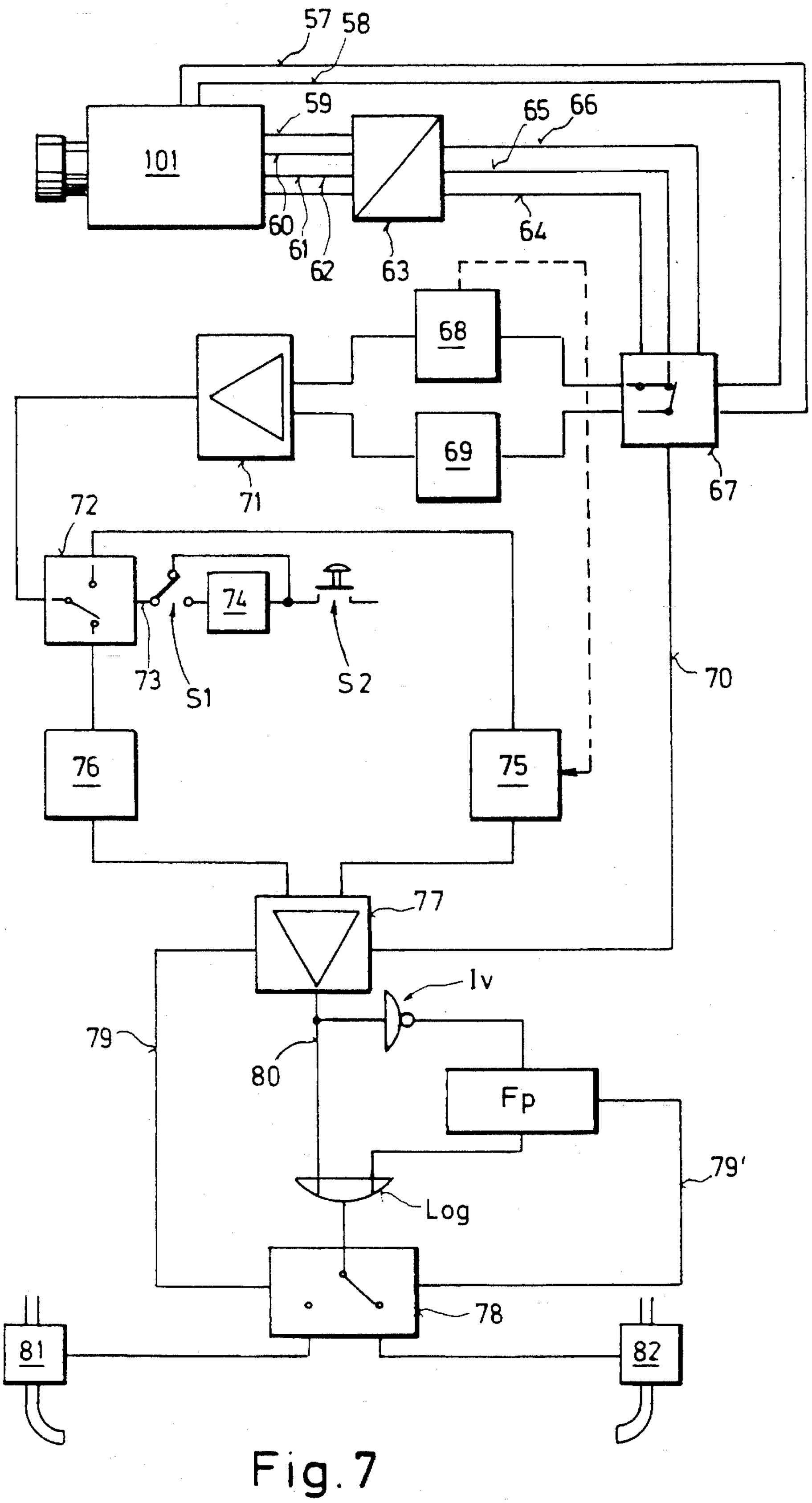

To obtain a reference luminosity and a reference color, either a standard sample is imaged into the path of rays of the camera, or—as preferred—a reference sample 51 is brought within the visual field 17 of the camera, which thus receives the reference colors red in field 51*a*, blue in field 51*b* and green in field 51*c* when scanning a predetermined place, which reference colors will then be compared with luminosity and color of ribbon 238 by means of a comparator circuit that is to be described below on the basis of FIG. 7. Differences thus disappear with the help of a vectorial difference determining unit. As will be described below, a similar difference method is also employed for the monitoring of the particles in the indentations 50. In this connection, the Euclidian distance can be utilized according to the formula $$d_e=(R-R_{ref})^2+(B-B_{ref})^2+(G-G_{ref})^2$$

in which $d_e$ is the difference,

R is the red component (actual and reference value 'ref'),

B is the blue component, and

G is the green component.

It may be said here that video cameras (independently of their type) normally operate with additive mixture of the colors, in which case the above-mentioned colors will be utilized. This mixing method will be preferred also for the purposes of the present invention. Yet it is also known to design compact video cameras with color band filters, in which case a subtractive color mixture will be used, with the colors red, blue and yellow, or magenta, cyane and yellow, respectively, being applied, which, for the present purposes, may be a possible use, but is not to be recommended.

To be able to accurately control jet nozzles 145 and 146 that are connected in series, ribbon 238 naturally runs with an exactly predetermined, preferably regulated, speed. However, the accuracy of the nozzle control will yet be improved, if the ribbon 238 comprises clock markings in predetermined distances, that are suitably assigned to indentations 50. These clock markings are represented here on both sides of ribbon 238, but in general it will do when such markings are provided merely at one of the ribbon edges. If required, the markings could be arranged at another place, possibly about in the middle of the ribbon, but the assignment of the signals derived from them will be simpler if the markings 52 are located at the edge.

Instead of clock markings 52, or additionally to them, it is also possible to arrange a further viewing camera or (better) an observation mirror—seen in the direction of movement of ribbon 238—behind jet nozzles 145, 146 (or any other sorting unit) to check whether a particle detected as "unacceptable", e.g., due to incorrect speeds has not been sorted out and, accordingly, to readjust the speed of ribbon 238. However, the arrangement of an additional camera amounts to further expenditures whereas the imaging, which may cover only a portion of the field of view, may—in certain cases—cause the monitoring in area 17 to be interrupted while superimposing the other image, either from the further camera or a mirror. For reasons of safety, this may call for an ejection of all the particles that could not be inspected. All the same, all these phenomena can easily be coped with by way of customary optical fade-in techniques, yet the dosage of particles may also take place in an intermittent manner, so that in the case of lacking particles in field 17 an automatical switching over to the observation of a corresponding field of view behind nozzles 145, 146 will occur. Just as well, however, ribbon 238 could be moved forward intermittently, thus giving the possibility, during the intermittences, to monitor the area behind nozzles 145, 146.

It is to be understood that jet nozzles 145, 146 are multiple nozzles, that is, they correspond to an array of nozzles arranged across the longitudinal extension of the ribbon, since each indentation 50 receiving a particle has to be assigned a separate and individually controllable independent nozzle, if one does not want to run the risk that besides an unacceptable particle also the particles lying next to it may be sorted out.

Figure 5:
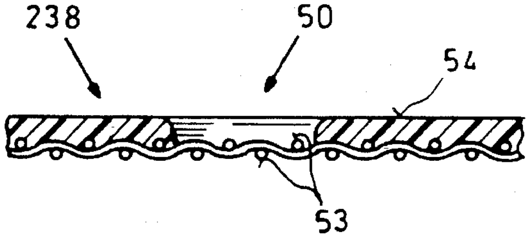

Ribbon 238 may be made—according to FIG. 5—from an air permeable basical fabric 53 with a coating 54 covering it, which latter is colored in the above-mentioned hue of a full color, such as blue (seldom in natural products). This coating 54, is —as apparent—missing in the area of the indentations 50, so that only the bare fabric 53 will form the base supporting the respective particle at these places.

From the foregoing explanations it will have appeared that the individual particles, when lying on a transport ribbon, are always inspected solely from one side. This naturally holds true also for a case where the particles are carried onto a non-moving supporting surface with, for example, a video camera moving along over them. In general, the inspection from only one side of the particle will do, however. If, on the other hand, it is desired in particular cases to inspect both sides of the particles facing each other, an arrangement according to FIG. 6 will have to be chosen.

In the arrangement of FIG. 6 there is provided a first ribbon 338 with a video camera 201 to which corresponding illumination units 115 are assigned, and which is succeeded by a corresponding number of jet nozzles 45, 46 (only two are represented, if desired, however, merely one of them will do). Via these jet nozzles 45, 46 the particles detected as "unaccepted" —when viewing the particles only from one side—are sorted out, whereas the remainder of the particles is carried on with the help of ribbon 338.

Moving onward, the particles then reach the area of a reversing station 55, in which a second ribbon is led tightly over ribbon 238, so that, after the turnover of the two ribbons by a plurality of turning rollers 56 at the end of this reversing station, the respective positions will be turned upside down, i.e., the second ribbon 438 will no longer be located above ribbon 338 but below it. By the tight guidance of the two ribbons 338, 438 lying next to one another, the particles of the bulk material are carried from one ribbon onto the other in an unaltered mutual allocation and are thereby turned by an angle of 180°, so that their side not visible beforehand, can now be viewed by a similar video camera 30, which in turn controls jet nozzles (not shown) that may be arranged on roller 240 (cf. FIG. 3).

In FIG. 7, the video camera 101 is depicted with its preferred circuitry, even though the following explanations may, of course, also hold true in an analogous manner for cameras 201 and 301. Such a customary solid-state or tube camera generally has six outputs for the emission of color signals, that is to say, an output 57 for the horizontal deflection signal (this term is meant to include also the corresponding signal of a solid-state camera), an output 58 for the vertical deflection signal, an output 59 for the red signal, an output 60 for the blue signal, and an output 61 for the green signal. In addition, there is an output 62 for the Y-signal (luminosity). For the processing it will be easier if a converter stage 63 is connected to these outputs, converting these signals into the so-called IHS-system, so that, at its output, there will be a line 64 for the intensity signal, a line 65 for the saturation signal, and a line 66 for the hue signal. Of course, the converter stage may also be omitted if camera 101 is designed already in such a manner that it comprises outputs corresponding to lines 64 to 66.

On the basis of FIG. 4, it has been shown that the reference sample 51 and the clock markings 52 are arranged at predetermined locations, so that, during a deflection period their corresponding signals will be situated at predetermined places within the video signal. Consequently, if lines 57, 58 are led to a switch-over stage 67, this will be able to detect by means of these deflection signals whether the input signal is derived from such a reference position 51, or 52, respectively, or from another position. Accordingly, the signals will be divided by the switch-over stage, with the reference signal derived from reference sample 51 being stored in a reference memory stage 68, and the signal derived from the ribbon surface, except for the clock marking signals, in a stage 69, whereas the clock marking signals are sent to an output line 70.

To the outputs of stages 68, 69 are connected the inputs of a comparator stage 71 that, by difference determination, compensates for any heterogeneities, or variations in luminosity of the background, respectively, so that a readjustment of the illumination will no longer be necessary. It is advantageous if a further difference determination is carried out, which is based on the learning ability of the circuitry.

For if a certain color, or luminosity of the particles of the bulk material, respectively, is required, one may proceed in various manners. The simplest way is to give a threshold value for a desired luminosity, and, when falling short of this luminosity threshold, to sort out the respective particle by operation of a jet nozzle or another sorting device. If, however, it is intended to sort according to color, a plurality of color channels (substantially corresponding to lines 59 to 62, or 64 to 66, respectively) may be provided in an analogous manner and respective threshold value transmitters may be arranged in these channels. This may be accomplished digitally by inputting the respective color parameters by a key set, which, on the one hand, will be quite troublesome, and, in addition to that, will not yield reliable results because of the many sources of error. Also with this arrangement another method will be chosen in accordance with the invention.

For if a learning run is started before sorting a mass of bulk material to be inspected by passing a number of particles (a single one would actually do) through the visual field ok a video camera 101, the color of these reference particles can be memorized to serve as a reference value for the desired color later on. For this purpose, a switch-over stage 72 may be provided at the output of the comparator stage 71 (or, if this is not provided because a regulation of the background according to the prior art is preferred, at the output of camera 101, or stage 69, respectively). In the present embodiment, this switch-over stage has (not necessarily, however) a switchable control input 73, so that its change-over can be controlled via a selector switch S1 by a timing member 74, which, after the reference sample has passed, automatically switches over the switch-over unit to normal operation, or the change-over may—according to the position of manual selector switch S1—also be carried out manually by a manual switch S2, by opening or closing of which the change-over of stage 72 may be accomplished. Such a manual switching will be of particular advantage if the period of time for the, preferably adjustable, timing member 74 cannot be determined accurately from the start (for example when a sample of particles is delivered some days beforehand to be able to accordingly sort out later on).

According to the position of switch-over stage 72, either learning operation or normal operation will be chosen, with at least one memory 75 being connected in the former case, which is preferably designed as a non-volatile memory (e.g. disc). So that a pre-delivery of a sample, as previously described, may be carried out even when various such samples are delivered, it is conceivable to make a plurality of storage locations 75 with selective access, i.e., either several separate memories or a single, correspondingly larger, memory 75 with addressable storage locations, connectable with the output signal of camera 101, or of comparator stage 71, respectively. It is convenient to connect memory 75 to memory 68 to be able, if required, to correct its contents in dependency upon the illumination color of the standardized color sample 51 (FIG. 4), thus preventing sorting errors. It is true that, alternately, it would also be conceivable to assign to the illumination such a regulating unit in which the color values are steadily maintained constant, but the connecting line, drawn in broken lines, between the two memories 68 and 75 represents the simpler way for a corresponding correction.

If the switch-over stage 72—controlled by timing member 74 or by switch S2—switches over to normal operation, it sends the signals received to a temporary storage stage 76 arranged in parallel to memory 75 or directly to the one input of a comparator or control stage 77 whose other input is associated with the output of the reference signal memory 75. Thereby it is possible to continuously compare the reference signal with the actual signal of the particles to be examined. The comparator stage 77 conveniently comprises a predetermined and suitably adjustable threshold value, so that it will emit no output signal at all in a case where the quality of the inspected particles lies within a certain range of tolerance. Nevertheless, it will send a signal to a switch-over stage 78 in dependency upon the kind of deviation, if this deviation signal should lie outside the range of tolerance. Via this switch-over stage 78, which can be switched, by way of an actuating line from one state into the other, the signal led to it via an output 80 is Used to control one of two control stages 81, or 82, respectively, with a respective valve as a final control element for the operation of a nozzle 45, or 46, respectively. For a synchronization of this operation the clock signal line 70 will be connected to comparator and control stage 77.

It is apparent, however, that line 80 does not control switch-over stage 78 in a direct way but that a shape processor Fp is connected with line 80. This shape processor receives the output signal of the difference determining unit 77, conveniently via an inverter stage Iv. For if vectorial difference determining unit 77, as previously described, does not emit any output signal at all in the case of acceptable particles but does this only with unacceptable particles, shape processor Fp will be operated via inverter Iv only in the case of particles of an acceptable color, which simplifies its operation (in comparison with a parallel operation of difference determinator and shape processor, which parallel operation is also possible, if required).

At the output of stages 77 and Fp there is arranged a logical element Log, represented here simply as OR-gate operating switch-over stage 78 in dependency upon the signals of the two stages 77 and Fp. With such a design, more than merely two ejection units 45, 46 will generally be aligned one behind the other to enable a sort according to color and size, or qualities, respectively.

It is to be understood that within the scope of the invention, numerous modifications are conveivable; for instance, the advantages of the supporting device provided by the invention may partly achieve their desired effects also in a case where the particles of bulk material are not arranged in a predetermined position and orientation relatively to each other, but when a preselected speed is ensured by the transport ribbon. The same holds true for the sorting device. On the other hand, the difference determining method, with which the monitoring unit according to the invention works, may be advantageous even independently of the application of the method provided by the invention, and the same holds true for a devise able to learn for the input of color parameters, as described in connection with FIG. 7, which design shall now be described in more detail on the basis of FIGS. 7A and 7B.

Figure 7A:
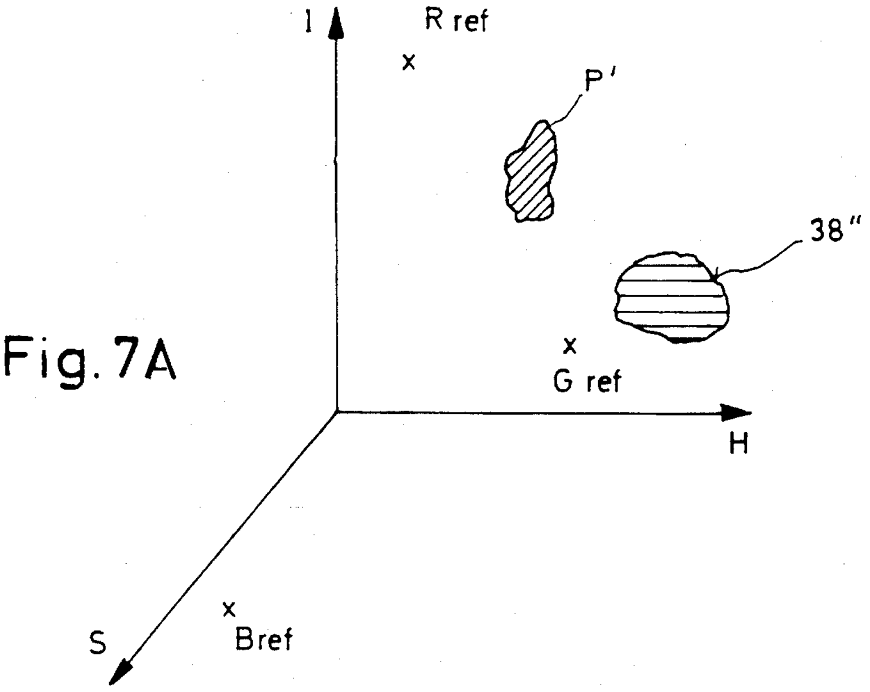

FIG. 7A depicts a tridimensional system of coordinates with a luminosity axis I, a saturation axis H and a hue axis S. Within this spatial system of coordinates the hues that can be found in an acceptable particle (conveniently, a plurality of such reference particles is passed through the visual field of video camera 101) will arrange themselves in the form of a "color cloud" P'.

Now it would already be possible to apply the reference colors P' thus obtained for a comparison with the particles to be sorted out. However, the accuracy will be increased if also color 38" of the background constituted by ribbon 238 is taken into consideration. On the basis of these data, a clear statement can be made as to whether an "acceptable" particle is under inspection, whether the background is just being scanned, or else whether a foreign color of a particle to be sorted out (neither P' nor 38") has been detected. It is true that the background could also be computed with the help of the horizontal and vertical deviation signals in case of need, for the openings 50 located next to each other are apt to continuously pass by the same place of the target in a succession, and via the clock signals 52 it is also possible to detect the presence of a row of particles, but this entails considerable inaccuracies, all the more so since it may happen that an opening 50 is not occupied (in which case it will probably function as a background color). The following truth table will result therefrom:

| Particle | Background | result | action |
|---|---|---|---|
| 0 | 0 | foreign part | ejection |
| 0 | 1 | ribbon, or 50 = empty | none |
| 1 | 0 | "acceptable" | actuation of shape processor Fp |
| 1 | 1 | does not occur | |

Figure 7B:
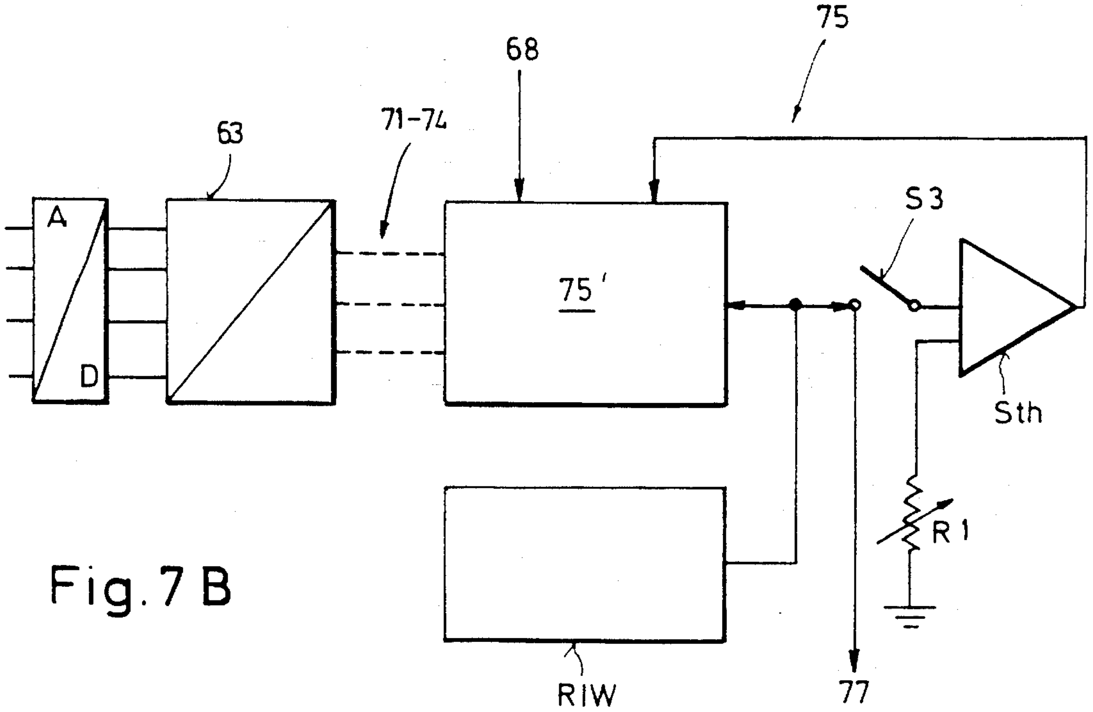

If the above-mentioned connection between memories 68 and 75 represented in broken lines in FIG. 7, exists, the reference signal for red $R_{ref}$, the reference signal for blue $B_{ref}$, and the reference signal for green $G_{ref}$ can be memorized within the IHS-system of coordinates that practically reflects the three-dimensional order within memory 75. These reference signals can then be examined, suitably at least at the start of operation, if necessary, however, also in periodic time intervals, by reading out the output signal of memory 68, in which the respective color signal derived from the standard color sample 51 is memorized and then comparing it with the memorized values $R_{ref}$, $B_{ref}$, and $G_{ref}$. If due to the occurrence of a change of hue of the illumination a deviation ensues, all color values will be corrected to the same extent (by a turn within the system of coordinates), so that the reference values P' and 38" will be adapted to it also in the case of an altered illumination. This is certainly simpler and safer than the regulation of illumination represented on the basis of FIG. 1, which is relatively complicated when considering the color values. FIG. 7B shows the design of memory 75 in a preferred embodiment as a threedimensional histogram processor. Starting from a digitally processing converter stage 63, suitably via an analog-digital converter A/D (the digitalization could, theoretically, also take place at a later stage of the signal processing, however, it will be most advantageous before stage 63), the IHS-signal reaches an addressable memory that is operated in a learning run by a read-increment-write-stage RIW until a first version of the color reference values P' and 38" is memorized.

In theory, already this first version of values detected for P' and 38" could be used for sorting particles. It may, however, be possible that, due to statistical errors, hues will appear which—for instance owing to local discolorations—not really belong to the set of reference values P' or 38". Thus, these hues will have appeared only in a few isolated cases within the viewed area and, therefore, will represent only a small part of the statistically collected color values. If, as a result, memory 75' is read out again and the histogram of the signals is compared with a predetermined threshold value by connecting a threshold switch $S_{th}$ by closing an input switch S3 (the threshold value is suitably adjustable by means of an adjusting resistance R1), all those hues that are statistically insignificant will be eliminated, and thus a corrected version of the reference values P' and 38" will be gained, which version is then read again in to memory 75 from the output of threshold switch $S_{th}$. Thereafter, switch S3 may be opened again and the adjusted values are read out to the vectorial difference determining unit 77.

Figures 8A, 8B:
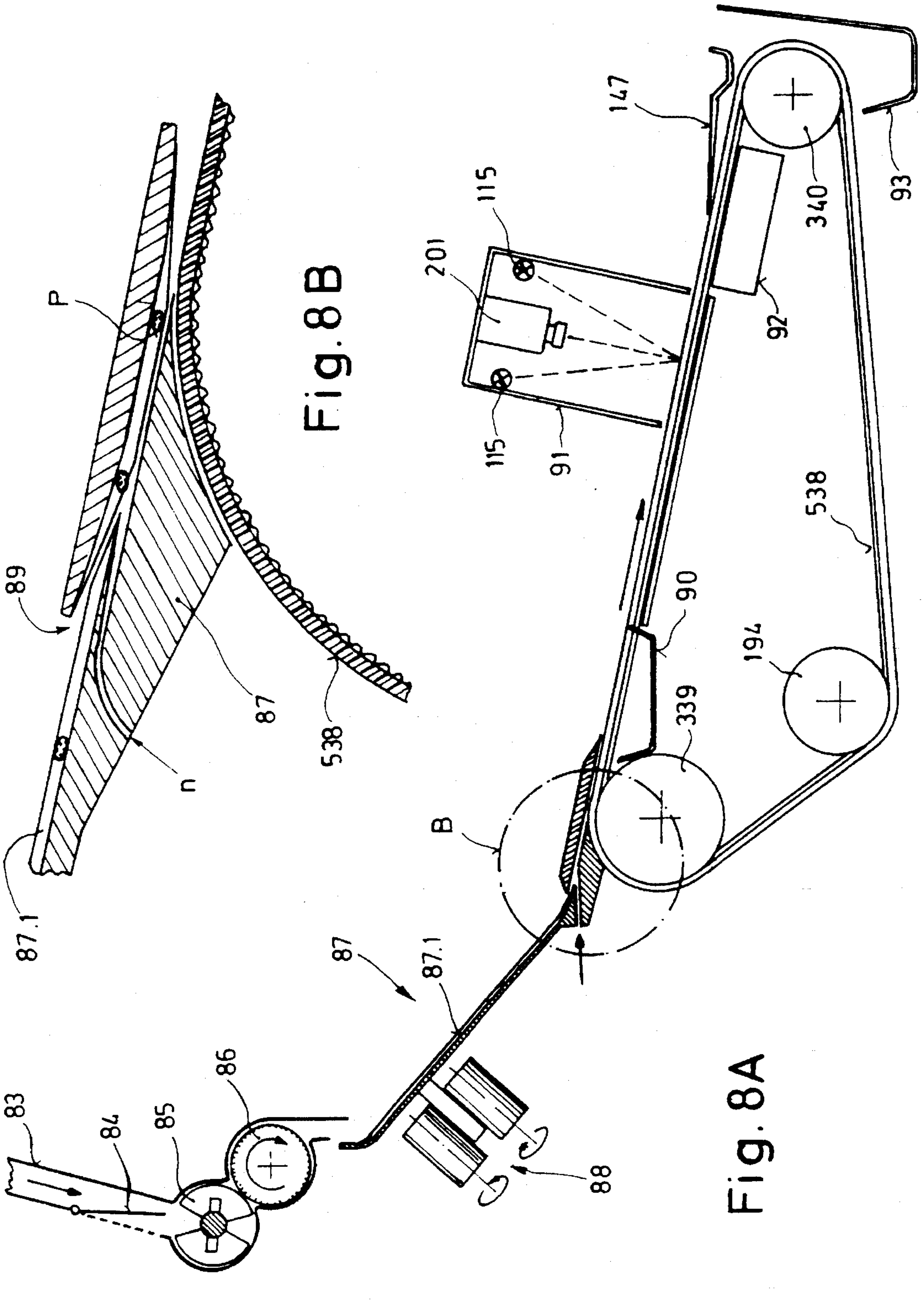

In FIG. 8A, material fed in and then to be sorted passes to a distributing unit 85, e.g., via an intake shaft 83 that conveniently comprises a dosing device, for instance in the form of a flap 84 altering the cross section of the shaft. Thereby, the arrangement may be designed similarly as represented in FIGS. 10 to 13 of US-PS 4 905 917 on the basis of unit 30 and a postponed feed roll 8, with the feed roll 86 immediately succeeding the distributing rotor 85 in the case of the present FIG. 8A.

To prevent agglomerations of particles, a vibrating conveyer 87 with a vibration drive is suitably provided for preparing the individualization, in which case it is advantageous to design vibrating conveyer 87 with individual feeding channels 87.1, conveniently running in parralel to each other in upstream direction, which feeding channels already separate individual rows of successive particles-from one another, since the channels 87.1 have a respective width corresponding to one width of particles. Thus, the particles will be distributed not only over the width of vibrating plate 87, but they will also be respectively arranged one after the other, so that merely the procedure of arranging the individual particles in an exactly specified position relative to each other remains to be carried out.

This procedure takes place within the area of detail B of FIG. 8A, as represented on an enlarged scale in FIG. 88. Accordingly, individual particles P spaced apart in distances not yet predetermined travel through the channels 87.1, open at their upper ends, of vibrating conveyer 87 up to its end region. Within the area of this end region, that is to say, in this case, at the very end of vibrating conveyer 87 (if required, also at a separated part), an accelerating unit 89 is suitably arranged for imparting particles P at least that speed with which runs a postponed transport ribbon 538, which is designed either according to one of the ribbons 38 (FIG. 1 to 3) or 228 (FIG. 4, 5), preferably, however, according to FIG. 9B as a toothed belt with suction openings 150 arranged in it subsequent to indentations 250. To prevent slippage, it is preferred to design ribbon 538 as a toothed belt in the manner represented. In this case, the clock markings 52, as described in connection with FIG. 4, need not necessarily be provided on the ribbon, rather an angle position transmitter could turn round with one of the rollers 339, 340, or 40, respectively, and 139 to ensure the emission of clock signals (cf. line 70 in FIG. 7). It would also be possible to use a rotational speed transducer with, suitably digitized, speed signals for the generation of the clock signals.

By the use of the accelerating unit 89 a non-uniform distribution of the particles P with separate agglomerations of particles subsequent to conveyer 87 will be prevented. On the contrary, particles P are suitably imparted such a speed that they roll along the surface of transport ribbon 538 until they are received by an indentation 250 (FIG. 9B), or 50, respectively (FIG. 5) or remain located in an unevenness of the surface (FIG. 1 to 3) constituted by the screen fabric 38, or 138, respectively. If required, a stripper or a brush may be provided above transport ribbon 538, which sweeps any particles left over on that part of the ribbon that has no cavities into a respective indentation. Any particles not received by the indentations of the ribbon pass into an overflow chute 90, wherefrom they are conveyed back to shaft 83 by a conveying unit (not shown). Thereupon, the particles P reach—in a manner shown in FIGS. 1, 2, or 4, respectively—in a predermined position and orientation relatively to each other, a monitoring unit suitably comprising camera 201 with illumination unit 115 described above already, if necessary, however, it could also be composed of individual non-electric converters. This apparatus, according to FIG. 8A, is preferably located in a lighttight casing 91 in order to eliminate the action of foreign light.

For a similar reason, i.e., to eliminate any interfering influences, a casing 92 succeeding the monitoring unit with camera 201 is arranged at the bottom side of ribbon 538—seen in the direction of movement of the ribbon—comprising the sorting devices 45, 46 already described above, or at least one of them, respectively. It may be mentioned here that, in principle, it would not be absolutey necessary to provide jet nozzles, since—if required—also a radiation, destroying unacceptable particles, such as laser beams, could be sent through the openings of the ribbon, which procedure is not preferred, however. In the case of FIG. 8A merely a single nozzle 45, or 46, respectively (cf. FIG. 1) is designed in casing 92, since only a single chute, or duct 147, respectively, will be provided to carry off the particles sorted out, whereas the particles found to be acceptable pass into a conveying duct 93 at the end of roller 340. A further possibility will be described below.

It may be mentioned that the drive of ribbon 538 is principally designed in the same manner as previously stated with respect to the other transport ribbons and rollers 39, or 40, respectively. It is suitable, however, to assign a tension roller urged by a biassing unit (not shown) to the ribbon, which tension roller keeps ribbon 538 continuously in a stretched condition.

It may be stated that also such a grooved plate 87 may be subjected to numerous modifications, for example, by dispensing with the vibration drive or by designing the grooves or ducts as slightly diverging in upstream direction rather than running in parallel. An additional individualizing effect may also be achieved by designing plate 87 as being composed of individual stripes of material of different friction running across the direction of channels 87.1, which either are uniform in width, or else are of increasing width in upstream direction. In the same way, the acceleration may be accomplished in various manners, for instance, also by an accelerating drum projecting through a slot in grooved plate 87 over at least a partial area, or a centrifugal disk, etc., provided already at the beginning of plate 87, which centrifugal disk tangentially accelerates the particles onto plate 87.

Figures 9A, 9B:
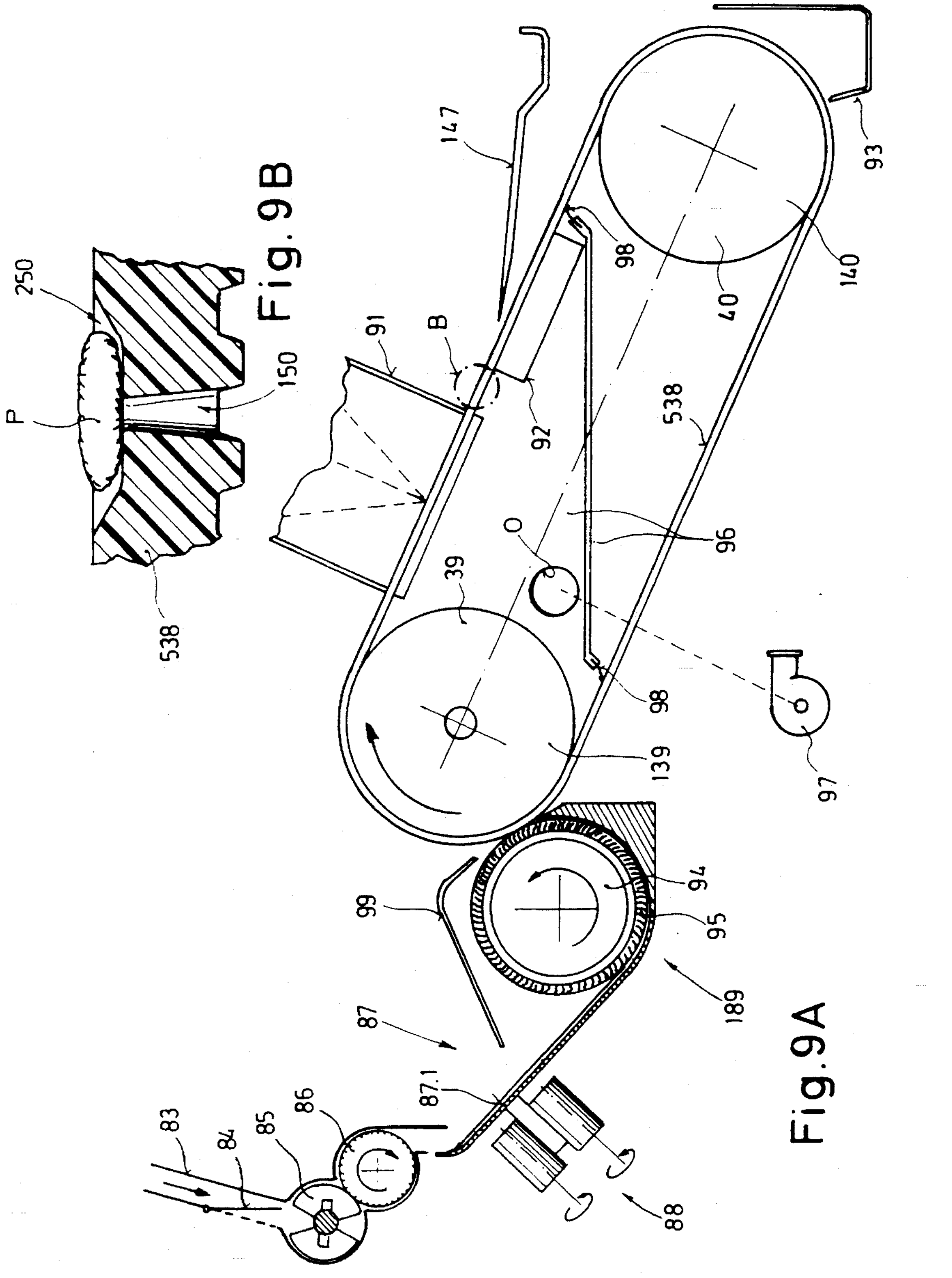

FIG. 9A represents a modification of FIG. 8A. Thus, the parts described in connection with FIG. 8A will not be explained in more detail hereafter. One main difference is to be found in that an accelerating unit 189 comprising a brush roll 94 is provided instead of the accelerating unit 89 illustrated in FIG. 8B. This brush drum sweeps the particles being conveyed in channels 87.2 up to ribbon 538 with about the same speed as said ribbon is moving. In principle, ribbon 538 could be arranged below brush roll 94, so that the particles are directly swept onto ribbon 538 by the vibrating conveyer. However, to ensure a certain acceleration distance, brush roll 94 will be partly enclosed by a surface 95 surrounding it, which surface carries the grains on to ribbon 538.

Here, the arrangement of air permeable openings, such as those suction openings represented in FIG. 9B, is utilized for a double purposes, whilst in the area of casing 92 the above-mentioned nozzle 45 is provided for blowing air through; roller 139 is conveniently designed similarly as represented on the basis of FIG. 2 and the rollers 140, 140', that is, in the form of two parts, so that in this area a negative pressure may take action undisturbedly on ribbon 538 lying in between. For this purpose, roller 139 is surrounded by a sealing housing with sealing walls 96, one of which comprises an opening 0 for connecting a schematically represented suction line 1 to a source of reduced pressure 97 in the form of a blower. These housing walls 96 are suitably provided with corresponding sealings 98, such as lip seals.

Thus, as soon the particles are being carried from the brush roll toward ribbon 538 and directed through area 95, said negative pressure begins to take effect in the area of the indentations 250 (FIG. 9B), sucking the particles P merely in the area of indentations 250, whereas in the other areas the particles follow the turn of roll 94 and are then thrown tangentially against a return sheet 99. Brush roll 94 thus brushes off that surface of ribbon 538 that is free from indentations 250 in the same manner as described as a possibility in connection with FIGS. 8A and 8B, in order to brush off those particles P not carried into indentations 250 (FIG. 9B) by accelerating unit 89, so that the particles may fall into overflow chute 90.

Figure 10:
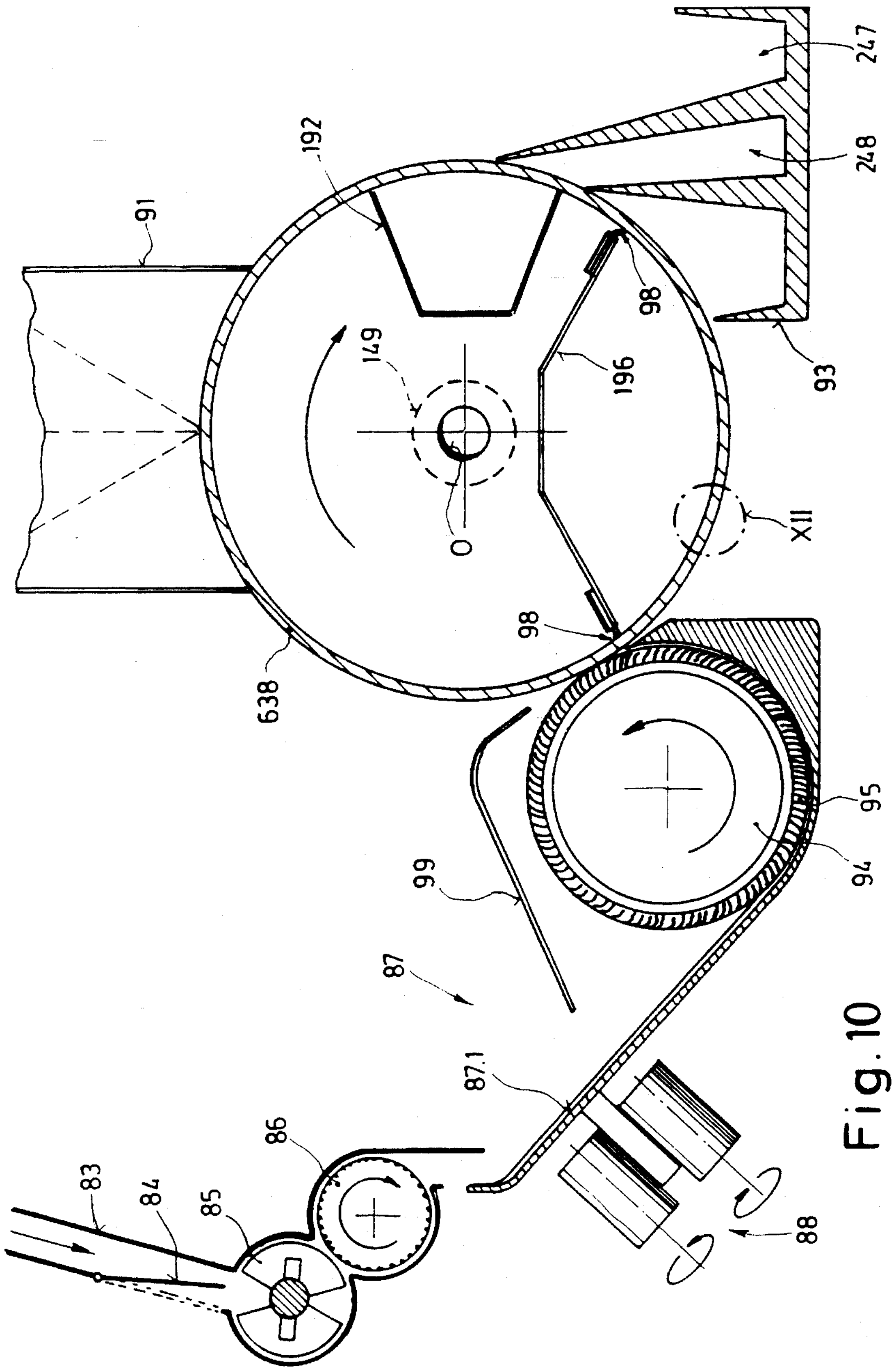

In the embodiment according to FIG. 10 the individualization is carried out by means of the construction units 87, 88, 94, and 95 described previously in a similar way, as explained on the basis of FIG. 9A. However, since a transport ribbon tends to be subjected to vibrations under certain circumstances, a drum 638 will be used here as an air permeable carrier. The drum may be designed in a detail XII of a cross-section parallel to the plane of drawing of FIG. 10 in a manner as illustrated on an enlarged scale by FIG. 12. For example, it is provided with individualizing chutes or channels 187.1, respectively, over its periphery, similarly to the feeding channels 87.1 of vibration conveyer 87, with similar suction holes 150 spaced apart being provided as already explained in connection with FIG. 9B. The particles P are then held tightly by said suction holes 150, thus being located in a predetermined position and orientation relatively to each other, whereafter they are led to the monitoring unit within casing 91. To accomplish a corresponding reduced pressure, an opening 0 is provided, conveniently extending through a hollow shaft end 149 represented in broken lines. Thus, a corresponding reduced pressure prevails in the interior of drum 638, arranged above a sealing wall 196, ensuring that particles P may be kept on drum 638 even in the case of high speeds, with housing 192 being so designed that the reduced pressure may take effect there, too, by way of example, so that particles will be ejected only when said reduced pressure is overcome by the jet pressure of nozzles (not shown) arranged in it. In casing 192 two nozzles 45, 46 (cf. FIG. 1) are provided, one of which throws the parts to be sorted out into a chute 247, the other into a chute or duct 248, whereas the tightening by means of sealing 98 and sealing wall 196 takes care that in the area below this wall 196 the suction pressure may not take effect, thus causing the particles found to be acceptable to fall into a chute or a duct 93.

Figure 11:
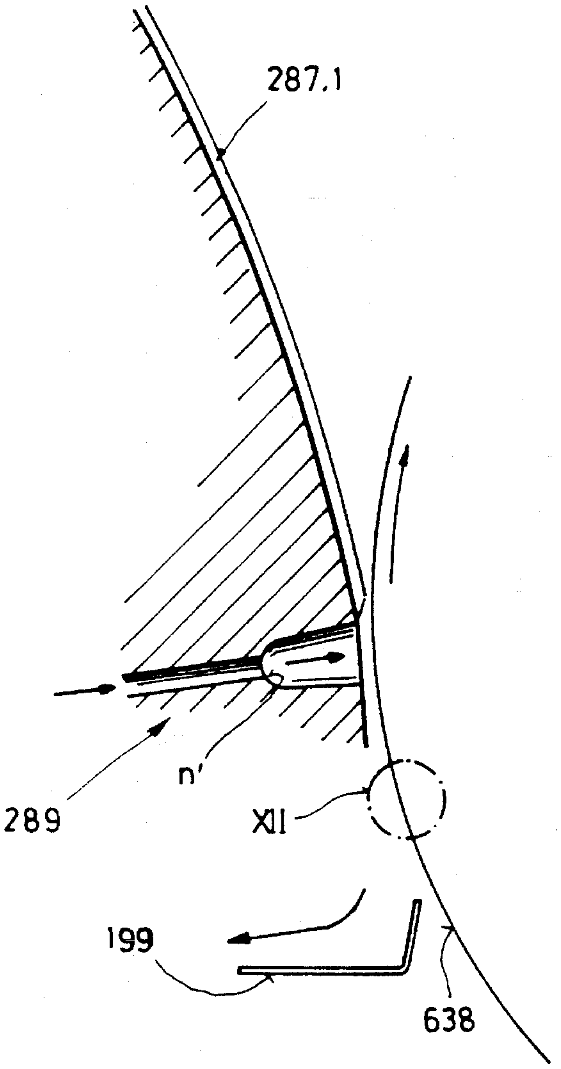
Figure 12:
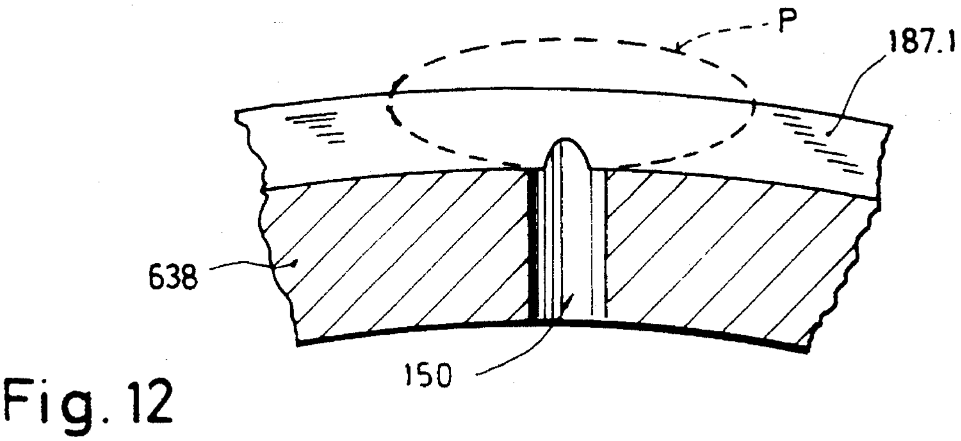
FIG. 12 is an enlarged longitudinal section paralleling the plane of drawing according to the details XII of FIG. 11 and/or 12, and FIG. 13 a diagram for illustrating a method as provided by the invention for the adjustment of a grinding gap.

The embodiment according to FIG. 11 essentially differs from the one in FIG. 10 in the design of the individualizing device cooperating with drum 638. In this arrangement, instead of vibrating conveyer 87, a pure gravity feed system acting along fall chutes 287.1 corresponding to the feeding channels 87.1 is realized. Where these fall chutes 287.1 come nearest to drum 638, a jet nozzle n' of an accelerating unit, corresponding to a jet nozzle n in FIG. 8B, is provided, which jet nozzle n' presses the grains failing down against the surface of drum 638, to permit the particles to be carried along. This arrangement —in analogy to the arrangement of FIG. 8B—may also be so designed that the jet nozzle 199 does not act vertically on the surface of drum 638, but rather more or less tangentially. This corresponds to the given constructional conditions, such as rotational speed of drum 638, fall angle of fall chute 287.1, size of the particles to be sorted, etc. Particles not received by the drum and its suction openings 150 (cf. FIG. 12) are thrown against a return sheet 199, which, for instance, is designed itself as a vibrating conveyer, to direct the particles, in a manner not shown, again to the fall chute or the fall chutes 287.1, respectively.

Figure 13:
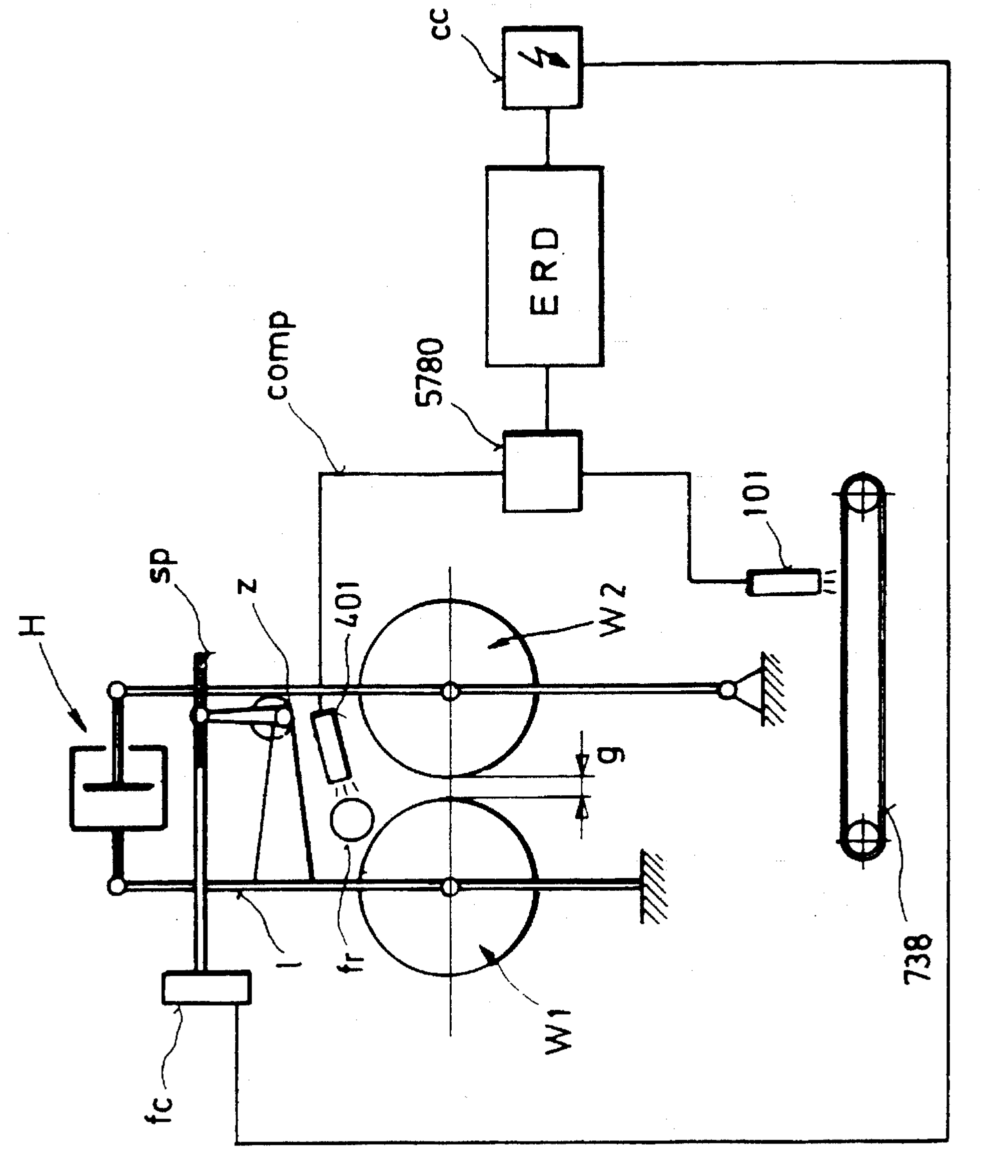

The FIG. 13 explained hereinafter is to show in principle how an optical monitoring unit, particularly of the kind described above, may be utilized also for the regulation of processes for treating material, such as especially of the grinding gap of a roll mill, and, in this case, particularly of a roll mill with at least two rolls W1 and W2, between which there is a grinding gap, said optical monitoring being coarsely adjustable with the help of a, for example hydraulic, setting mechanism H known per se. Additionally, a fine adjustment is provided in that a supporting lever 1 is made adjustable by an electromotor fc and a worm spindle sp driven by electromotor fc; as well as by a crank pin z displaceable via said spindle.

In principle, it would, of course, also be possible to provide only a single adjusting unit, such as the unit H, and to regulate this. As to the arrangement of two regulation types of the kind described, it is referred to the entire disclosure of WO 89/08501 (now U.S. Pat. No. 5,031,845) (FIG. 18) incorporated herein by reference.

The illustrated roll mill with rolls W1 and W2 may be, by way of example, a flaking mill, to which a granular material to be squeezed to flakes by means of the rolls W1 and W2 may be supplied through a feed roll fr as for flaking mills known per se, for example, from U.S. Pat. No. 4 905 917. To regulate the size of the grinding gap g, the result of said squeezing action will be optically inspected thereafter. Since a sort need not be carried out in this design, the transport ribbon 738 used for this method does not necessarily have to be air permeable, as described in the foregoing embodiments; in fact, a monitoring may even be carried out during the free fall of the particles, which procedure corresponds to the prior art. However, from the above explanations, it may be assumed that the accuracy can be improved with the help of the monitoring method described on the basis of the above-mentioned Figures (cf. particularly FIGS. 4 and 7), which monitoring method, therefore, is to be preferred for the present purpose.

Accordingly, the camera 101 is arranged above ribbon 738, detecting the color and/or the size of the flakes produced in grinding gap g, and transmitting these data to an evaluation unit 5780 (corresponding, for instance, to the parts 57–80 of FIG. 7). This evaluation unit releases an output signal controlling the motor for fine adjustment fc via respective drive stages ERD and cc, to bring the color and/or the size of the flakes (preferably the size) to the desired value by adjustment of grinding gap g.

If color and/or size of the material supplied through the feed roll may vary, a comparison signal may be sent to evaluation unit 5780 via a line comp, which comparison signal is derived from a similar camera 401 that—conveniently within the area of the supply at fr—inspects the material passing by, whereupon it emits a corresponding comparison signal. The evaluation unit 5780 then compares the signals emitted by camera 101 against those of camera 401, with the difference signal serving to regulate motor ft. It will be understood that evaluation unit 5780 may be simplified in cases where, either only the color matters (the uncrushed outside of the particles may be of a color differing from that of the particles after the squeezing by rolls W1, W2), or else only the size is important.

Within the scope of the invention, the most diverse individualizing units may be employed, for instance, one as described in the DE-OS-35 08 439, but it is evident that the embodiments described above are particularly advantageous for the present purposes.

Moreover, the sort could be carried out instead of with jet nozzles 45, 46 also by providing—if required—flaps resting against the upper side of the empty belt of the ribbon, thereby eliminating the suction pressure, said flaps acting as movable covering units displaceable from an open position into a cover position, so that the particle P no longer being kept by the suction pressure (similarly to the case of the fixed covering unit 198 in FIG. 10) may fall down. In such a design, a respective solenoid will be suitably assigned to each respective flap, attracting this flap, for instance in a direct way when in an actuated state, thereby lifting it off from the openings 50, or 150, respectively, said solenoid bringing the flap into a cover position only when a particle is to be thrown out. In the same way, it is also possible to execute the sort by means of a selectively electric, or electrostatic charging of the particles to be sorted out, respectively, in particular by means of a corona discharge.

It is evident that the term "particles" is to be understood in its widest sense and is meant to include also larger particles, for example pellets, shaped material from dough, etc., supplied for inspection in greater amounts.

A further possibility consists in arranging the brush roll 94 —instead of the parts 83 to 87—immediately within a bulk of particles, said brush roll directing the particles toward the air permeable supporting surface, where the individualization is accomplished by way of the immediate suction at the openings 150.

What is claimed is:

1. Individualizing device for separating particles from a bulk material to bring each of the particles into a predetermined position and orientation, said device comprising:

individualizing means for spacing said particles apart from each other along a path of travel of said particles;

surface forming means disposed along said path of travel of said particles and having a surface perforated to form indentations for receiving respective ones of said particles to be sorted, said particles traveling along said path from said individualizing means to said surface forming means; and accelerating means for imparting an accelerated motion of said particles to be received in said indentations in a direction toward said surface forming means, said accelerating means being located between said individualizing means and said surface forming means.

2. Individualizing device as claimed in claim 1, wherein said accelerating means comprises nozzle means for directing a gas jet against said surface forming means.

3. Individualizing device as claimed in claim 1, wherein said surface forming means comprises suction openings smaller than said particles, said suction openings being distributed at least over part of the surface of said surface forming means, and a source of reduced pressure for sucking and holding said particles within said suction openings.

4. Individualizing device as claimed in claim 3, further comprising covering means extending over a restricted area of said surface forming means for releasing individual ones of said particles sucked onto said surface forming means from the action of said reduced pressure.

5. Individualizing device as claimed in claim 1, wherein said accelerating means comprises brush drum means rotatable for throwing said particles toward said surface forming means.

6. Individualizing device as claimed in claim 5, further comprising guiding means for guiding said particles from said brush drum means to said surface forming means.

7. An individualizing device for separating individual particles from a bulk material to be inspected by optical means, said device comprising:

vibrating support means being inclined with respect to a horizontal plane so as to provide an upper end and a lower end for conveying said particles along a predetermined path toward said optical inspection means;

feeding means arranged at said upper end to feed said particles onto said vibrating support means;

vibration generating means for generating vibrations in said support means to individualize said particles at least partially on said support means;

conveyor means having a first end arranged at the lower end of said support means and a second end for conveying said particles from said support means towards said optical inspection means, said conveyor means including:

a moving surface for receiving said particles and moving said particles along said path to said optical inspection means;

accelerating means for imparting an acceleration to said particles during transfer of said particles from said vibrating support means to said moving surface and before reaching said optical inspection means, said accelerating means comprising nozzle means for directing a gas jet onto said particles to be fed towards said optical inspection means.

8. Individualizing device as claimed in claim 7, wherein nozzle means is arranged to feed said jet onto said particles from below said path.

9. Individualizing device as claimed in claim 7, further comprising means forming a channel, said nozzle means opening into said channel for injecting said gas jet into said channel.

10. Individualizing device as claimed in claim 7, wherein said conveyor means comprises mechanical conveying means having a conveying direction towards said optical inspection means, said nozzle means being directed towards said mechanical conveying means.

11. Individualizing device as claimed in claim 10, wherein said nozzle means is directed at least partially in said conveying direction.

12. An individualizing device for separating individual particles from a bulk material to be inspected by optical inspection means, said device comprising:

a transport system for transporting particles along a path of travel past an optical inspection means, said transport system comprising vibration generating means for generating vibrations in a vibratory region of said travel path to individualize said particles at least partially in said vibratory region;

feeding means for feeding said particles onto said travel path; and wherein said transport system further comprises a moving surface for carrying said particles along said path from said vibration generating means to said optical inspection means; and air-pressure means operative during a transfer of said particles from said vibration generating means to said moving surface, said air-pressure means serving to impart an airborne force to said particles along said travel path contiguous said vibratory region for arranging said particles before said optical inspection means.

13. A system, comprising:

a conveyor surface moveable to carry articles on said conveyor surface along a path of travel in a selected direction;

driving means arranged in driving relationship with said conveyor surface for moving it in said direction at a selected speed;

supply means for supplying said articles to be positioned onto said conveyor surface moving in said direction at said selected speed;

blower means for blowing a gas and being arranged to blow a jet of gas onto said articles in the direction of motion of said conveyor surface to accelerate said articles to a speed of movement approximately equal to said selected speed; and wherein said supply means includes individualizing means for feeding particles out of a bulk thereof, said blower means following said individualizing means along said path of travel.

14. The system as claimed in claim 13, further comprising channel forming means to guide said jet of gas and said accelerated articles in the direction of said conveyor surface.

15. The system as claimed in claim 13, wherein said blower means are arranged to blow said jet under a predetermined angle towards said conveyor surface.

* * * * *